United States Patent
Sugawara

[11] Patent Number: 5,920,433
[45] Date of Patent: Jul. 6, 1999

[54] LARGE RELATIVE APERTURE TELECENTRIC LENS

[75] Inventor: Saburo Sugawara, Kawasaki, Japan

[73] Assignee: Canon Kabushiki Kaisha, Tokyo, Japan

[21] Appl. No.: 08/900,131

[22] Filed: Jul. 25, 1997

[30] Foreign Application Priority Data

Jul. 31, 1996 [JP] Japan .................................. 8-202062

[51] Int. Cl.⁶ .................................................. G02B 13/22
[52] U.S. Cl. .......................... 359/663; 359/649; 359/754
[58] Field of Search .................................. 359/649–651, 359/663, 749–753, 761–762, 770, 781–783, 754–756, 680–682

[56] References Cited

U.S. PATENT DOCUMENTS

| | | | |
|---|---|---|---|
| 3,909,115 | 9/1975 | Kano | 350/214 |
| 4,572,620 | 2/1986 | Kikuchi | 350/427 |
| 4,891,663 | 1/1990 | Hirose | 355/53 |
| 4,986,642 | 1/1991 | Yokota et al. | 359/708 |
| 5,005,957 | 4/1991 | Kanamori et al. | 359/708 |
| 5,050,974 | 9/1991 | Takasugi et al. | 359/708 |
| 5,099,361 | 3/1992 | Yamamoto et al. | 359/708 |
| 5,257,134 | 10/1993 | Sugawara | 359/679 |
| 5,303,087 | 4/1994 | Hayakawa et al. | 359/708 |
| 5,303,088 | 4/1994 | Sugawara | 359/753 |
| 5,539,579 | 7/1996 | Miyatake et al. | 359/634 |
| 5,550,679 | 8/1996 | Sugawara | 359/689 |
| 5,552,938 | 9/1996 | Sugawara | 359/691 |
| 5,600,490 | 2/1997 | Sugawara et al. | 359/690 |
| 5,745,297 | 4/1998 | Kaneko et al. | 359/651 |

FOREIGN PATENT DOCUMENTS 4-311910 11/1992 Japan .

*Primary Examiner*—Georgia Epps
*Assistant Examiner*—Jordan M. Schwartz
*Attorney, Agent, or Firm*—Fitzpatrick, Cella, Harper & Scinto

[57] ABSTRACT

A projection lens, which is as fast as 1.5 or thereabout in F-number and has an excellent telecentric property, includes, in order from a screen side, a first lens unit having a positive refractive power in a retrofocus form and a second lens unit. The first lens unit includes, in order from the screen side, at least two negative meniscus lenses convex toward the screen side, a positive lens having a refractive power on the screen side which is stronger than that of an opposite surface thereof, a positive lens having a refractive power on an image generating plane side which is stronger than that of an opposite surface thereof, a cemented lens composed of a negative lens and a positive lens and having a cemented surface convex toward the screen side, and at least one positive lens. The second lens unit includes, in order from the screen side, at least one positive lens and a negative lens having a refractive power on the screen side which is stronger than that of an opposite surface thereof.

12 Claims, 8 Drawing Sheets

LARGE RELATIVE APERTURE TELECENTRIC LENS

BACKGROUND OF THE INVENTION

1. Field of the Invention

The present invention relates to a large relative aperture telecentric lens and, more particularly, to a projection lens adapted for use in a liquid crystal projector or the like.

2. Description of Related Art

In projection lenses for projecting an original image generated on a liquid crystal display or a cathode ray tube onto a screen in enlarged scale, there have been proposed a wide variety of projection lenses for use with the cathode ray tube, which are as fast as 1.5 or less in F-number. Concerning a projection lens for use in the three-tube type cathode ray tube projector, mention may be made of the proposals in, for example, Japanese Laid-Open Patent Application No. Hei 4-311910.

In the conventional projection lens described above, however, since a concave lens for correcting field curvature is disposed near the image plane, telecentricity is poor. Therefore, the above conventional projection lens cannot be used as a projection lens for use with the liquid crystal display, in which contrast varies to large extent depending on the angle of incidence of light. Also, in the above conventional projection lens, the corner illumination is as low as 35% or thereabout, and, therefore, a problem arises in that the projected image becomes dark in the marginal zone.

Accordingly, there have been few proposals made for a projection lens which is as fast as 1.5 or thereabout in F-number and still has a good telecentric property with the corner illumination increased so greatly that it is even applicable to the liquid crystal projector.

BRIEF SUMMARY OF THE INVENTION

An object of the invention is to provide a projection lens which is as fast as 1.5 or thereabout in F-number and excellent in telecentricity, and has a rich corner illumination suited to be used in the single chip type liquid crystal projector.

To attain the above object, in accordance with one aspect of the invention, there is provided a projection lens which comprises, in order from a large conjugate side to a small conjugate side, a first lens unit of positive refractive power in a retrofocus form and a second lens unit having at least one positive lens and a negative lens having a refractive power on the large conjugate side which is stronger than that of an opposite surface thereof.

In particular, it is preferable that the first lens unit comprises, in order from the large conjugate side to the small conjugate side, at least two negative meniscus lenses convex toward the large conjugate side, a positive lens having a refractive power on the large conjugate side which is stronger than that of an opposite surface thereof, a positive lens having a refractive power on the small conjugate side which is stronger than that of an opposite surface thereof, a cemented lens composed of, in order from the large conjugate side to the small conjugate side, a negative lens and a positive lens and having a cemented surface convex toward the large conjugate side, and at least one positive lens.

Further, it is preferable to satisfy the following condition:

$$-0.1 < f/f_2 < 0.35 \quad (1)$$

(more preferably, $0 < f/f_2 < 0.3$) where $f$ is a focal length of the entire projection lens, and $f_2$ is a focal length of the second lens unit.

Further, it is preferable to satisfy the following conditions:

$$0.1 < f/f_{2p} < 0.5 \quad (2)$$

(more preferably, $0.15 < f/f_{2p} < 0.45$)

$$-0.5 < f/f_{2n} < -0.02 \quad (3)$$

(more preferably, $-0.45 < f/f_{2n} < -0.05$) where $f_{2p}$ is an overall focal length of a positive lens component in the second lens unit, and $f_{2n}$ is a focal length of a negative lens component in the second lens unit.

Further, it is preferable to satisfy the following conditions:

$$0.05 < d_{m2}/f < 0.35 \quad (4)$$

(more preferably, $0.1 < d_{m2}/f < 0.3$)

$$-20 < v_{2p} - v_{2n} < 20 \quad (5)$$

(more preferably, $-15 < v_{2p} - v_{2n} < 15$) where $d_{m2}$ is an air separation between the positive lens component and the negative lens component in the second lens unit, $v_{2p}$ is a mean value of Abbe numbers of the positive lens component in the second lens unit, and $v_{2n}$ is an Abbe number of the negative lens component in the second lens unit.

Further, it is preferable to satisfy the following conditions:

$$20 < v_{1hp} - v_{1hn} < 45 \quad (6)$$

(more preferably, $25 < v_{1hp} - v_{1hn} < 40$)

$$20 < v_{1fn} - v_{1mfp} < 50 \quad (7)$$

(more preferably, $25 < v_{1fn} - v_{1mfp} < 45$) where $v_{1hp}$ is an Abbe number of the positive lens in the cemented lens in the first lens unit, $v_{1hn}$ is an Abbe number of the negative lens in the cemented lens in the first lens unit, $v_{1fn}$ is a mean value of Abbe numbers of negative lenses which are disposed on the large conjugate side of the positive lens having a refractive power on the large conjugate side which is stronger than that of an opposite surface thereof, in the first lens unit, and $v_{1mfp}$ is an Abbe number of the positive lens having a refractive power on the large conjugate side which is stronger than that of an opposite surface thereof, in the first lens unit.

Further, it is preferable to satisfy the following conditions:

$$n_{1mfp} > 1.7 \quad (8)$$

(more preferably, $n_{1mfp} > 1.75$)

$$n_{1mrp} > 1.7 \quad (9)$$

(more preferably, $n_{1mrp} > 1.75$) where $n_{1mfp}$ is a refractive index of the positive lens having a refractive power on the large conjugate side which is stronger than that of an opposite surface thereof, which is disposed approximately in a middle portion in the first lens unit, and $n_{1mrp}$ is a refractive index of the positive lens having a refractive power on the small conjugate side which is stronger than that of an opposite surface thereof, which is disposed approximately in a middle portion in the first lens unit.

Further, it is preferable that the first lens unit and the second lens unit each have at least one aspheric surface.

Further, it is preferable that the aspheric surface in the first lens unit takes a position nearest to the large conjugate side in the first lens unit, and, in a case where the aspheric surface is used in a negative lens, a negative power of the aspheric surface becomes progressively weaker away from an optical axis, and in a case where the aspheric surface is used in a positive lens, a positive power of the aspheric surface becomes progressively stronger away from the optical axis.

Further, it is preferable that the aspheric surface in the second lens unit is arranged such that, in a case where the aspheric surface is used in a positive lens, a positive power of the aspheric surface becomes progressively weaker away from an optical axis, and in a case where the aspheric surface is used in a negative lens, a negative power of the aspheric surface becomes progressively stronger away from the optical axis.

Further, it is preferable to satisfy the following condition:

$$0.1 < D_{12}/f < 1.3 \qquad (10)$$

(more preferably, $0.2 < D_{12}/f < 1.2$) where $D_{12}$ an the air separation between the first lens unit and the second lens unit.

Further, it is preferable to satisfy the following condition:

$$0.08 < f/l_1 < 0.35 \qquad (11)$$

(more preferably, $0.11 < f/l_1 < 0.27$) where $l_1$ is an overall length of the first lens unit.

Further, it is preferable that a point at which an on-axial principal ray and an off-axial principal ray intersect lies in between two positive lenses which are disposed approximately in a middle portion in the first lens unit.

These and other objects and features of the invention will become apparent from the following detailed description of preferred embodiments thereof taken in conjunction with the accompanying drawings.

BRIEF DESCRIPTION OF THE SEVERAL VIEWS OF THE DRAWING

Herein.

I: a first lens unit.

II: a second lens unit.

P: a cover glass.

S: a sagittal image focus.

M: a meridional image focus, d: a spectral d-line.

F: a spectral F-line, and

C: a spectral C-line.

DETAILED DESCRIPTION OF THE INVENTION

Hereinafter, preferred embodiments of the invention will be described in detail with reference to the drawings.

FIGS. 1 to 8 in block diagram show the numerical examples 1 to 8 of the invention, respectively. FIGS. 9A to 9D through FIGS. 16A to 16D show the aberrations of the numerical examples 1 to 8 of the invention, respectively, in the case of a magnification of $1/27$.

Figure 1:
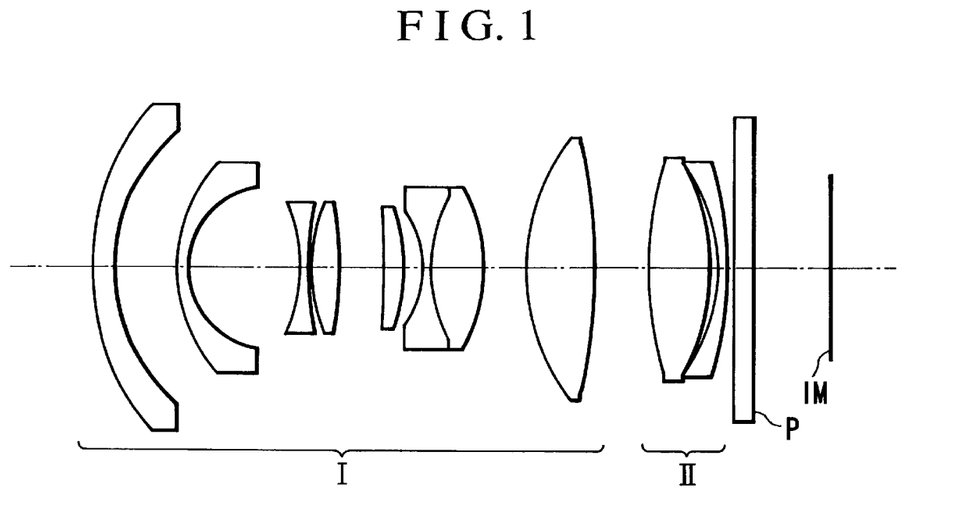
FIG. 1 is a lens block diagram of a numerical example 1 of the invention.
Figure 2:
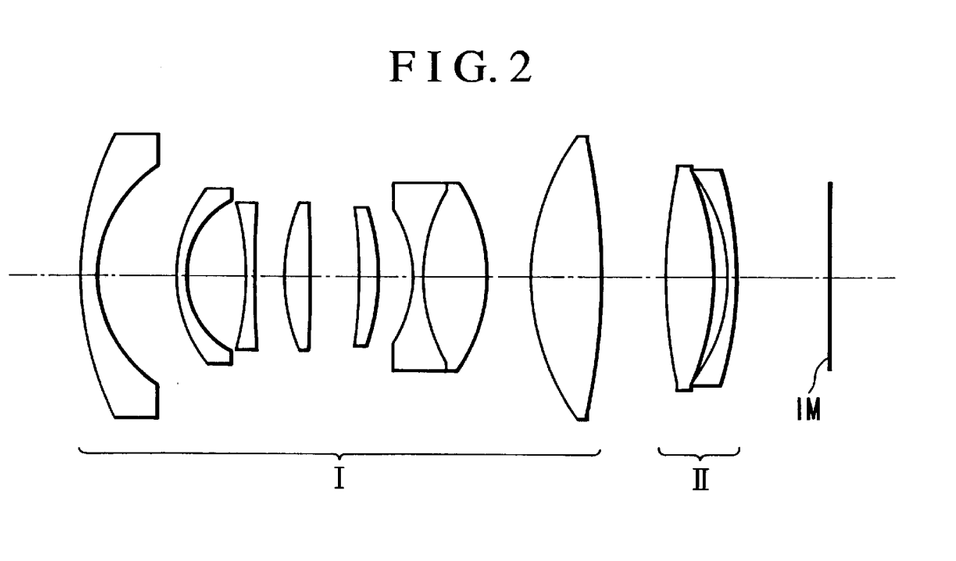
FIG. 2 is a lens block diagram of a numerical example 2 of the invention.
Figure 3:
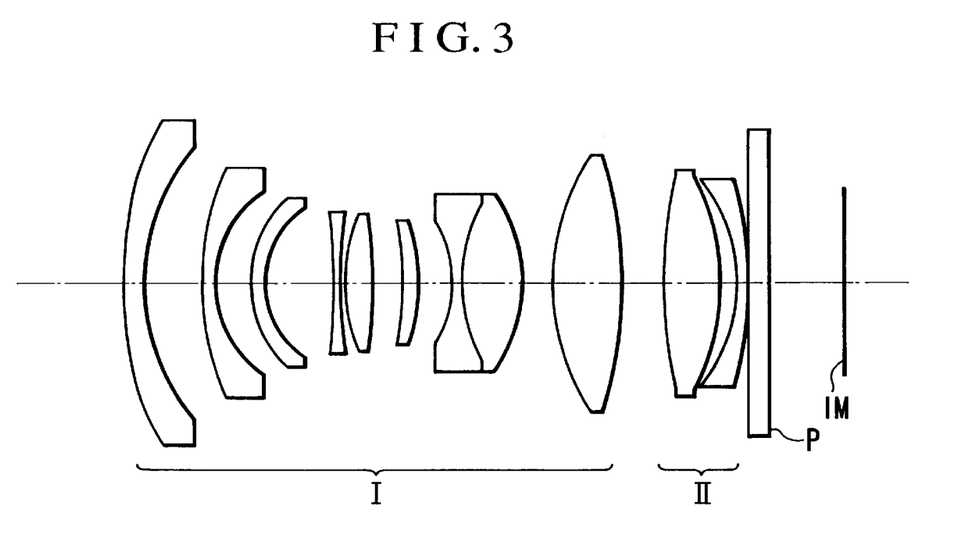
FIG. 3 is a lens block diagram of a numerical example 3 of the invention.
Figure 4:
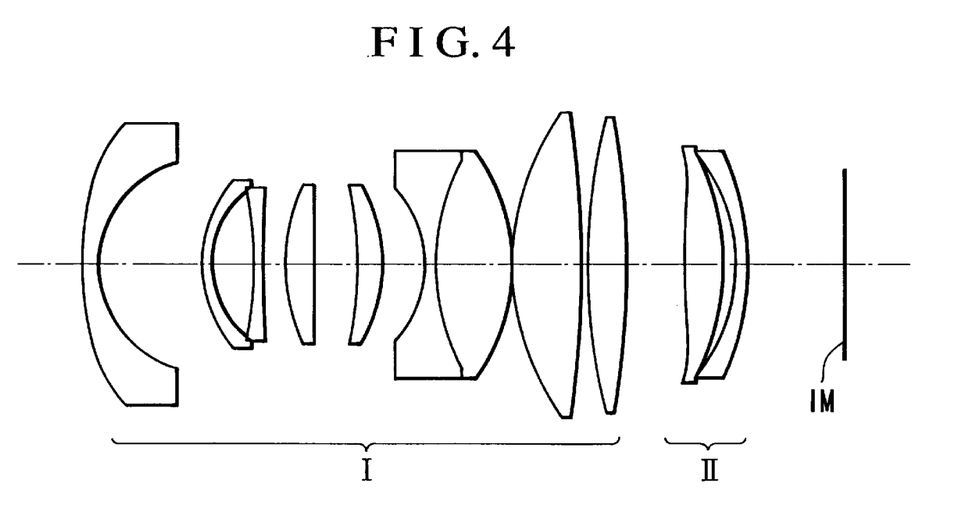
FIG. 4 is a lens block diagram of a numerical example 4 of the invention.
Figure 5:
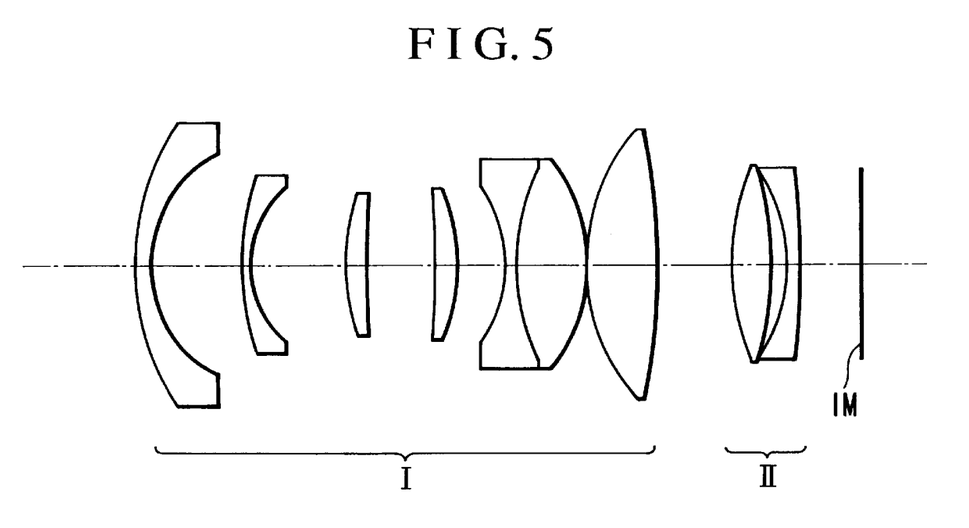
FIG. 5 is a lens block diagram of a numerical example 5 of the invention.
Figure 6:
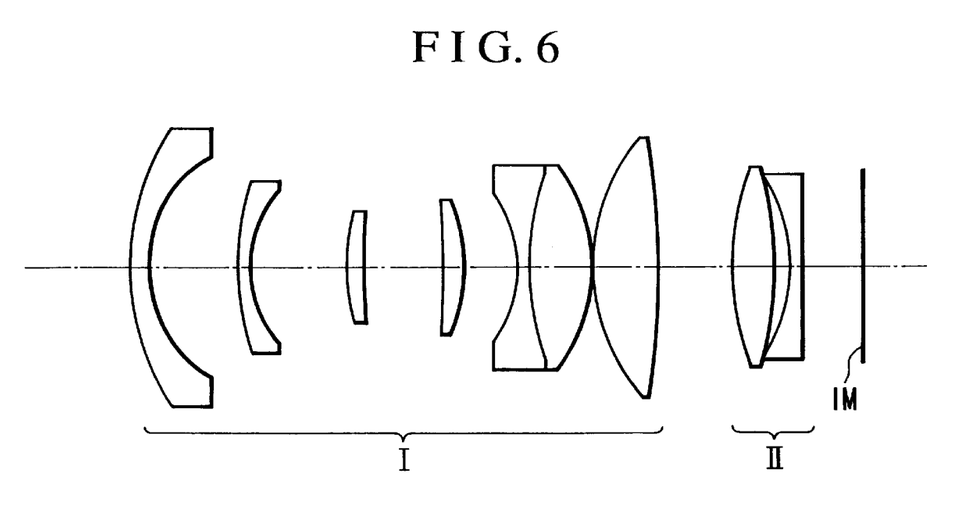
FIG. 6 is a lens block diagram of a numerical example 6 of the invention.
Figure 7:
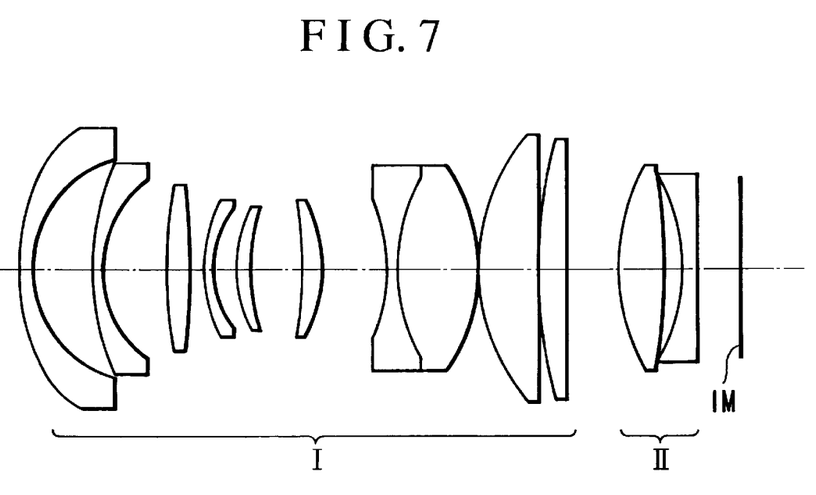
FIG. 7 is a lens block diagram of a numerical example 7 of the invention.
Figure 8:
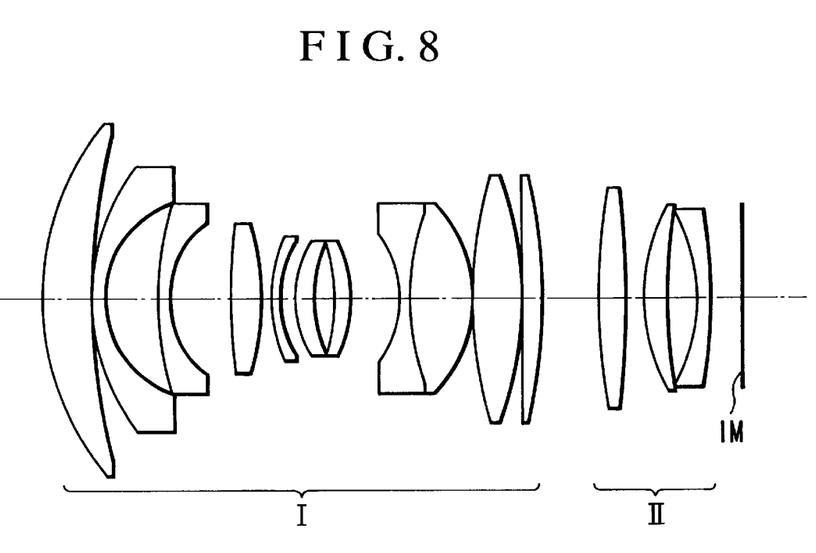
FIG. 8 is a lens block diagram of a numerical example 8 of the invention.
Figure 9A:
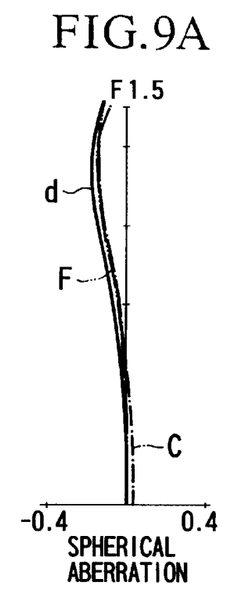
FIGS. 9A, 9B, 9C and 9D are graphic representations of the various aberrations of the numerical example 1 of the invention.
Figure 9B:
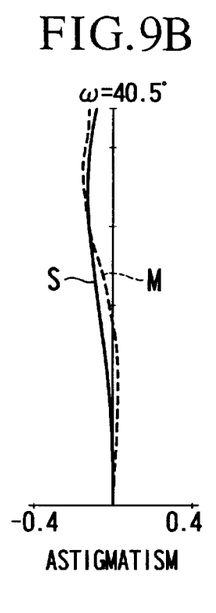
Figure 9C:
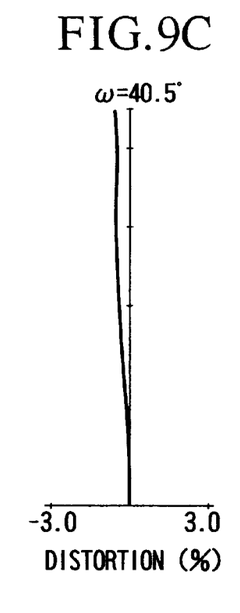
Figure 9D:
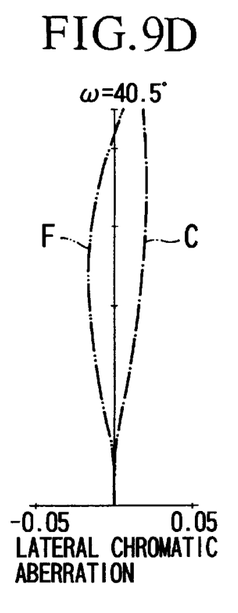
Figure 10A:
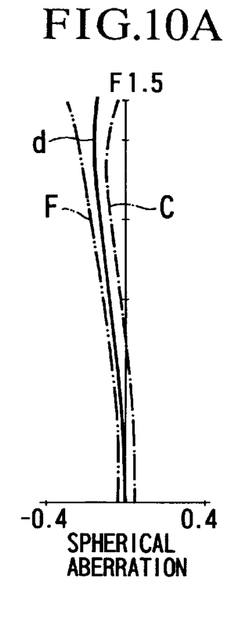
FIGS. 10A, 10B, 10C and 10D are graphic representations of the various aberrations of the numerical example 2 of the invention.
Figure 10B:
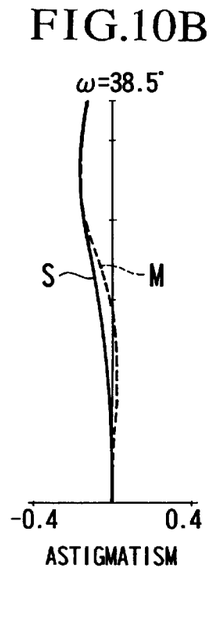
Figure 10C:
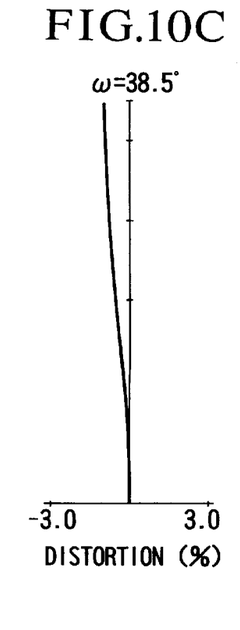
Figure 10D:
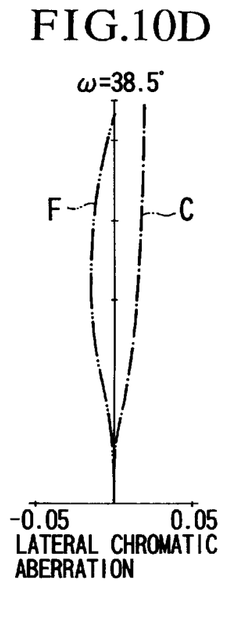
Figure 11A:
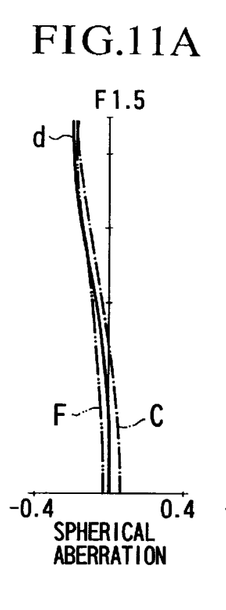
FIGS. 11A, 11B, 11C and 11D are graphic representations of the various aberrations of the numerical example 3 of the invention.
Figure 11B:
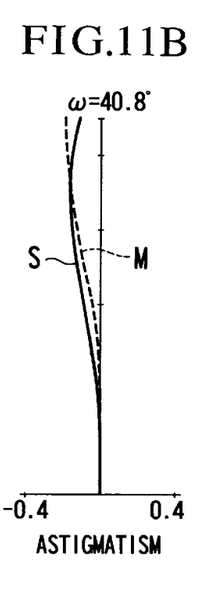
Figure 11C:
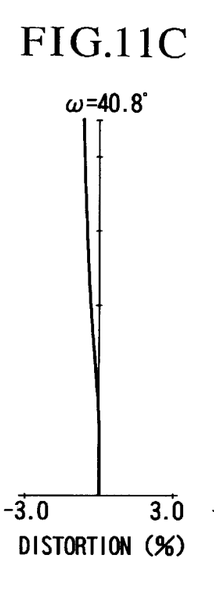
Figure 11D:
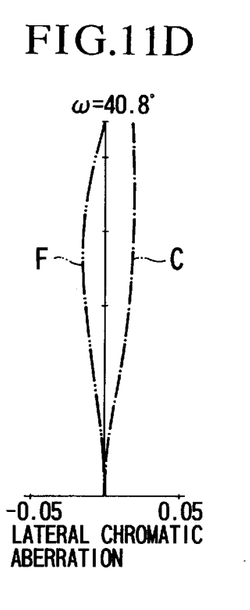
Figure 12A:
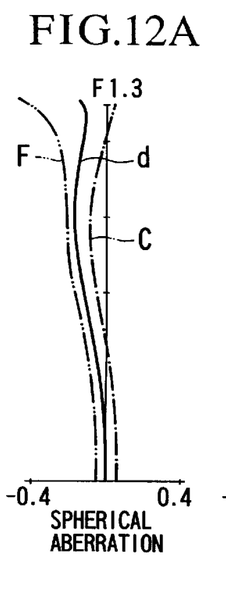
FIGS. 12A, 12B, 12C and 12D are graphic representations of the various aberrations of the numerical example 4 of the invention.
Figure 12B:
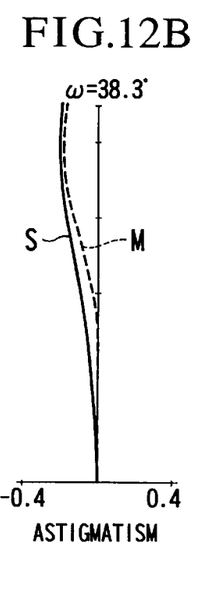
Figure 12C:
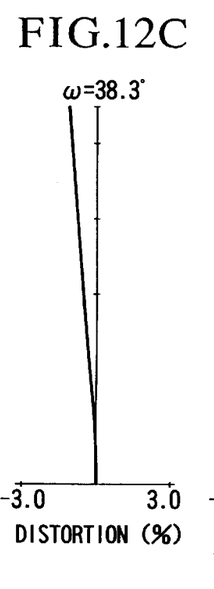
Figure 12D:
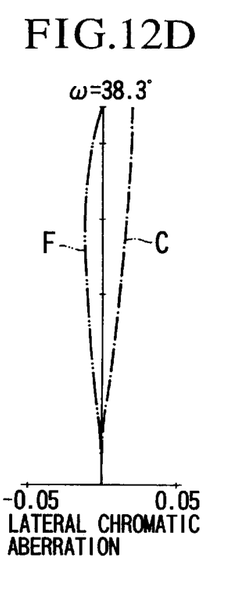
Figure 13A:
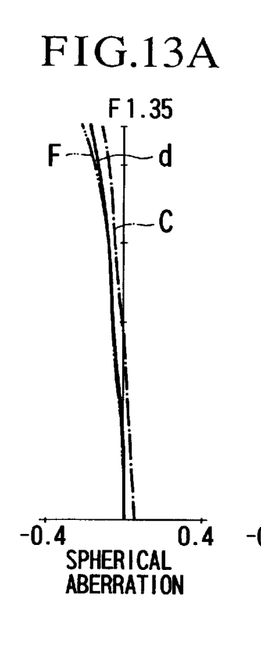
FIGS. 13A, 13B, 13C and 13D are graphic representations of the various aberrations of the numerical example 5 of the invention.
Figure 13B:
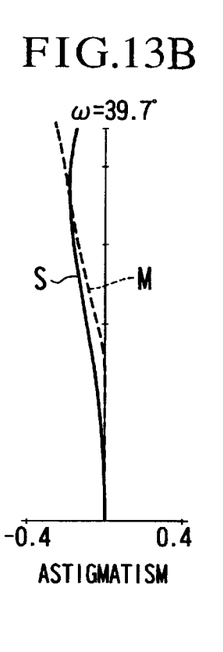
Figure 13C:
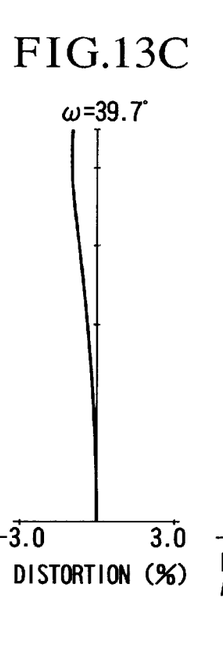
Figure 13D:
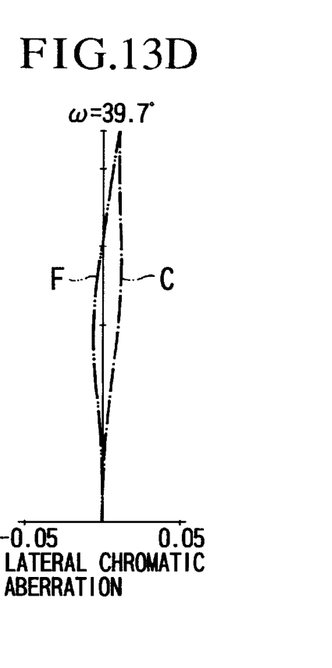
Figure 14A:
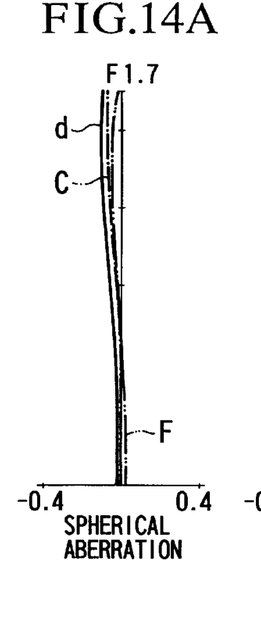
FIGS. 14A, 14B, 14C and 14D are graphic representations of the various aberrations of the numerical example 6 of the invention.
Figure 14B:
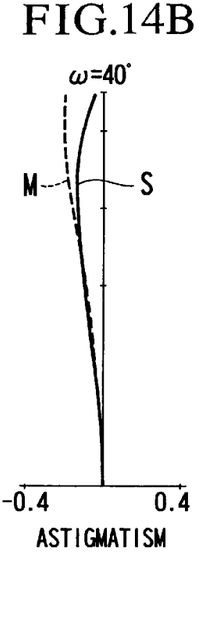
Figure 14C:
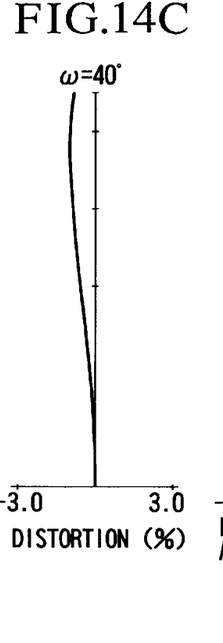
Figure 14D:
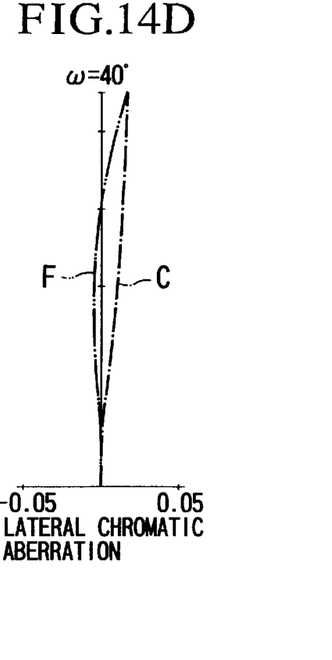
Figure 15A:
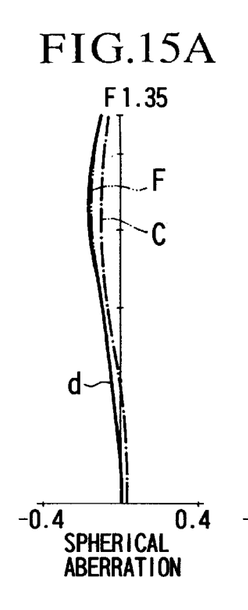
FIGS. 15A, 15B, 15C and 15D are graphic representations of the various aberrations of the numerical example 7 of the invention.
Figure 15B:
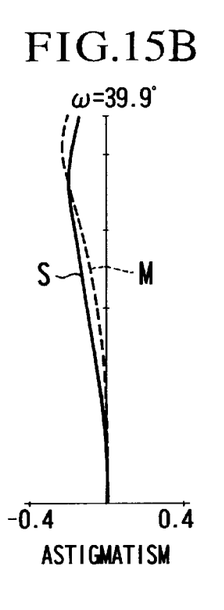
Figure 15C:
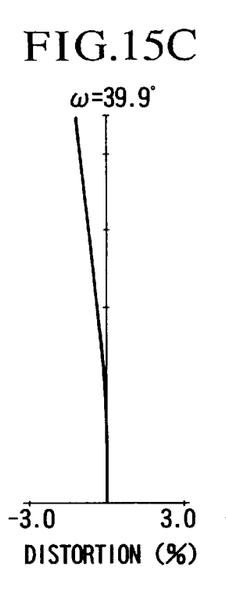
Figure 15D:
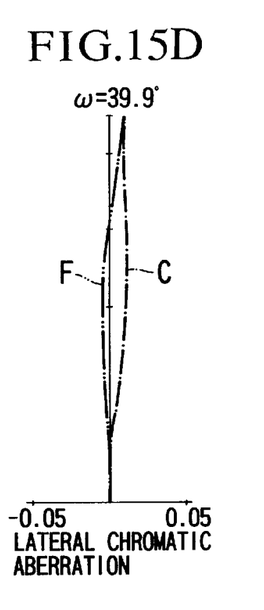
Figure 16A:
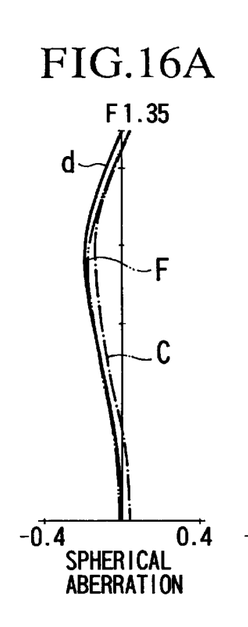
FIGS. 16A, 16B, 16C and 16D are graphic representations of the various aberrations of the numerical example 8 of the invention.
Figure 16B:
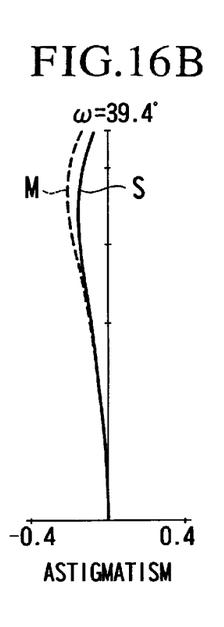
Figure 16C:
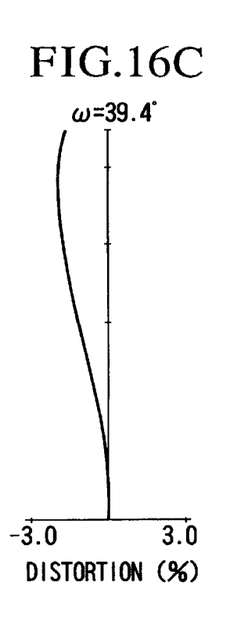
Figure 16D:
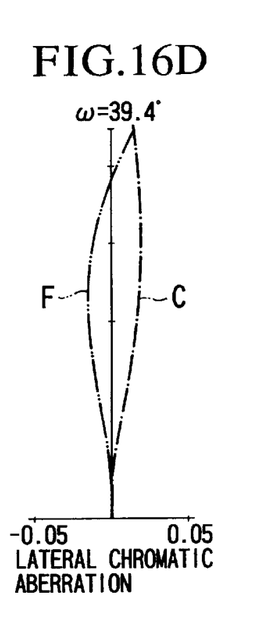

In FIG. 1, a first lens unit I, when counted from a large conjugate side (screen side) to a small conjugate side, has a positive refractive power and is in the form of the retrofocus type. A second lens unit II comprises at least one positive lens and a negative lens having a refractive power on the large conjugate side which is stronger than that of an opposite surface thereof. A cover glass P is used for a liquid crystal panel which serves as the small conjugate side on which an image is generated. Incidentally, the term "retrofocus" type used in the embodiments of the invention means that the first lens unit has its rear principal point lying on the small conjugate side of the last lens surface thereof. Also, the term "a refractive power . . . which is stronger" means that a refractive power of the surface in question is stronger than that of an opposite surface thereof. Incidentally, reference character IM denotes an image generating plane of the liquid crystal panel.

With the projection lens configured as described above, an image generated on the image generating plane IM of the liquid crystal panel is projected through the first and second lens units I and II onto the screen.

In order to keep a good telecentric property, the first lens unit I is so constructed as to include many negative lens elements on the large conjugate side and many positive lens elements on the small conjugate side. Therefore, there is a tendency that, for the off-axial light beam, there are many prism components of the same orientation, and, for example, since a light beam which enters the large conjugate side from the upper side of the first lens unit passes through those parts of the lens elements which correspond to the prism elements having their acute angles pointed down, large astigmatism and distortion are produced. To correct these aberrations, the second lens unit is disposed in the space between the first lens unit and the small conjugate point to produce the reverse aberrations. In particular, there is disposed a positive lens on the large conjugate side in the second lens unit, and an aspheric surface is introduced to a lens surface on the large conjugate side of the positive lens. Thus, the angle of incidence of light on a lens surface on the large conjugate side of a negative lens which is the last lens nearest to the small conjugate side is made large, so that the astigmatism and distortion produced in the first lens unit are corrected.

The significance of each of the above-described conditions (1) to (11) will be explained below.

The condition (1) gives a range for the ratio of the focal length of the entire lens system to the focal length of the second lens unit. In a range beyond the lower limit of the condition (1), the off-axial light beam is flipped upward by the second lens unit, so that the diameter of those of the lens elements of the first lens unit which are on the small conjugate side becomes too large. In a range beyond the upper limit of the condition (1), the off-axial light beam is too converged by the second lens unit, so that a light beam which goes to the other image heights overlaps the off-axial light beam by too large an amount at those of the lens surfaces in the first lens unit which are on the small conjugate side. Therefore, it becomes difficult to correct the off-axial light beam.

The condition (2) gives a range for the ratio of the focal length of the entire lens system to the overall focal length of the positive lens component in the second lens unit. In a range beyond the lower or upper limit of the condition (2), the powers of the positive lens component becomes too weak or strong. As a result, it becomes difficult to satisfy the condition (1).

The condition (3) gives a range for the ratio of the focal length of the entire lens system to the focal length of the negative lens component of the second lens unit. In a range beyond the lower or upper limit of the condition (3), the power of the negative lens component of the second lens unit becomes too weak or strong. As a result, it becomes difficult to satisfy the condition (1).

If the focal lengths of the positive lens component and the negative lens component relative to the focal length of the entire lens system lie within the ranges of the conditions (1) and (2), the second lens unit can produce reversed astigmatism and distortion to those of the first lens unit by almost equal amounts. In the entire lens system, therefore, a good optical performance can be obtained.

The condition (4) gives a range for the ratio of the air separation between the positive lens component and the negative lens component of the second lens unit to the focal length of the entire lens system. In a range beyond the lower limit of the condition (4), reversed aberrations to the aberrations the first lens unit produces cannot be sufficiently produced by the air separation between the positive lens component and the negative lens component of the second lens unit. In a range beyond the upper limit of the condition (4), the air separation between the positive lens component and the negative lens component of the second lens unit becomes too long, so that the off-axial light beam is flipped down largely by the second lens unit. Therefore, undercorrection of distortion results disadvantageously.

The condition (5) gives a range for the difference between the mean value of the Abbe numbers of the positive lens component of the second lens unit and the Abbe number of the negative lens component of the second lens unit. In a range beyond the lower or upper limit of the condition (5), achromatism or chromatism is carried out where the height from the optical axis of the off-axial light beam is large. Therefore, large lateral chromatic aberrations of higher order are produced disadvantageously.

The condition (6) gives a range for the difference between the Abbe numbers of the positive lens and the negative lens of the cemented lens in the first lens unit. In a range beyond the lower limit of the condition (6), under-correction of longitudinal chromatic aberration and lateral chromatic aberration results. In a range beyond the upper limit of the condition (6), longitudinal chromatic aberration and lateral chromatic aberration tend to be over-corrected.

The condition (7) gives a range for the difference between the Abbe number of the positive lens that lies at an almost middle portion in the first lens unit and has a refractive power on the large conjugate side which is stronger than that of an opposite surface thereof and the mean value of the Abbe numbers of the negative lenses which lie on the large conjugate side of that positive lens. In a range beyond the lower limit of the condition (7), longitudinal chromatic aberration becomes over-corrected and lateral chromatic aberration becomes under-corrected. In a range beyond the upper limit of the condition (7), longitudinal chromatic aberration becomes under-corrected and lateral chromatic aberration becomes over-corrected. So, these should be avoided.

The conditions (5), (6) and (7) are concerned with the correction of chromatic aberrations and have an aim to take a form that allows almost correction of the lateral chromatic aberration to be carried out where the height from the optical axis of the off-axial light beam is low. By using such a form, the produced amount of lateral chromatic aberrations of higher order can be minimized.

The conditions (8) and (9) give ranges for the refractive index of the positive lens that lies at an almost middle portion in the first lens unit and has a refractive power on the large conjugate side which is stronger than that of an opposite surface thereof and the refractive index of the positive lens that lies at an almost middle portion in the first lens unit and has a refractive power on the small conjugate side which is stronger than that of an opposite surface thereof. In ranges beyond the lower limits of the conditions (8) and (9), large spherical aberrations of higher order are produced.

The condition (10) gives a range for the ratio of the air separation between the first lens unit and the second lens unit to the focal length of the entire lens system. In a range beyond the lower limit of the condition (10), the width of the light beam which passes through the second lens unit becomes too large, so that the overlapped amount on a light beam which goes to the different image height becomes large. Therefore, the off-axial aberrations cannot be corrected sufficiently. In a range beyond the upper limit of the condition (10), the width of the light beam which passes through the second lens unit becomes too small. Therefore, the dust on the lens surfaces becomes conspicuous in the projected image.

The condition (11) gives a range for the ratio of the overall length of the first lens unit to the focal length of the entire lens system. In a range beyond the lower limit of the condition (11), the overall length of the entire lens system becomes too long. In a range beyond the upper limit of the condition (11), the overall length of the entire lens system becomes too short. Therefore, light beams which go to the different image heights overlap to too large an amount at the lens surfaces of the large and small conjugate sides of the first lens unit, so that it becomes difficult to correct the off-axial aberrations.

To correct astigmatism and distortion, an aspheric surface is used at a lens surface nearest to the large conjugate side in the first lens unit. It is preferable that, in a case where the aspheric surface is applied to a negative lens, a negative power of the aspheric surface becomes progressively weaker away from an optical axis. In a case where the aspheric surface is applied to a positive lens, a positive power of the aspheric surface becomes progressively stronger away from the optical axis. If the aspheric surface is used in the surface on which the off-axial light beam is incident at as high a height from the optical axis as possible, the overlapped amount of the light beams which go to the different image heights becomes small. Therefore, the off-axial aberrations can be corrected well.

Another aspheric surface may be used in the second lens unit. To correct astigmatism and distortion, it is preferable that, in a case where the aspheric surface is used in a positive lens, a positive power of the aspheric surface becomes progressively weaker away from an optical axis. In a case where the aspheric surface is used in a negative lens, a negative power of the aspheric surface becomes progressively stronger away from the optical axis.

To correct coma well, it is preferable that a point at which an on-axial principal ray and an off-axial principal ray intersect lies in between the two positive lenses which take almost middle positions in the first lens unit.

Next, numerical examples 1 to 8 of the invention are shown.

In the numerical data, ri is the radius of curvature of the i-th lens surface when counted from the large conjugate side, di is the i-th lens surface separation when counted from the large conjugate side, ni is the refractive index for the spectral d-line of the i-th lens when counted from the large conjugate side, and vi is the Abbe number of the i-th lens when counted from the large conjugate side.

The shape of an aspheric surface is expressed by the following equation:

$$x = \frac{(y^2/r)}{1 + \sqrt{1-(1+k)\cdot(y/r)^2}} + A4 \cdot y^4 + A6 \cdot y^6 + A8 \cdot y^8 + A10 \cdot y^{10} + A12 \cdot y^{12} + A14 \cdot y^{14}$$

where R is the radius of the osculating sphere, k is the conic constant, and Ai is the aspheric coefficient of i-th order.

The values of the factors in the conditions for the numerical examples 1 to 8 are shown in Table-1.

TABLE 1

| Condition No. | Numerical Example | | | |
|---|---|---|---|---|
| | 1 | 2 | 3 | 4 |
| (1) | 0.217 | 0.202 | 0.199 | 0.163 |
| (2) | 0.342 | 0.353 | 0.331 | 0.270 |
| (3) | −0.136 | −0.165 | −0.145 | −0.109 |
| (4) | 0.122 | 0.125 | 0.168 | 0.126 |
| (5) | −6.7 | −6.8 | −6.8 | −6.8 |
| (6) | 31.7 | 31.7 | 31.7 | 31.7 |
| (7) | 38.07 | 36.97 | 38.7 | 36.97 |
| (8) | 1.84666 | 1.84666 | 1.84666 | 1.84666 |
| (9) | 1.834 | 1.834 | 1.834 | 1.834 |
| (10) | 0.578 | 0.674 | 0.457 | 0.595 |
| (11) | 0.182 | 0.188 | 0.183 | 0.183 |

| Condition No. | Numerical Example | | | |
|---|---|---|---|---|
| | 5 | 6 | 7 | 8 |
| (1) | 0.140 | 0.090 | 0.199 | 0.136 |
| (2) | 0.358 | 0.344 | 0.297 | 0.282 |
| (3) | −0.248 | −0.292 | −0.253 | −0.179 |
| (4) | 0.174 | 0.183 | 0.212 | 0.321 |
| (5) | −6.8 | −6.8 | −6.8 | −1.75 |
| (6) | 31.7 | 31.7 | 31.7 | 31.7 |

TABLE 1-continued

| | | | | |
|---|---|---|---|---|
| (7) | 35.25 | 35.25 | 34.07 | 33.43 |
| (8) | 1.84666 | 1.84666 | 1.84666 | 1.84666 |
| (9) | 1.834 | 1.834 | 1.834 | 1.834 |
| (10) | 0.820 | 0.807 | 0.588 | 0.637 |
| (11) | 0.183 | 0.181 | 0.176 | 0.185 |

Numerical Example 1:

f = 21.3    Fno = 1:1.5    2ω = 81°

| | | | |
|---|---|---|---|
| *r1 = 118.655 | d1 = 4.00 | n1 = 1.49171 | v1 = 57.4 |
| r2 = 43.042 | d2 = 14.92 | | |
| r3 = 36.775 | d3 = 2.50 | n2 = 1.51633 | v2 = 64.1 |
| r4 = 19.166 | d4 = 26.10 | | |
| r5 = −35.840 | d5 = 1.80 | n3 = 1.51633 | v3 = 64.1 |
| r6 = 69.116 | d6 = 0.56 | | |
| r7 = 39.160 | d7 = 6.25 | n4 = 1.84666 | v4 = 23.8 |
| r8 = −117.458 | d8 = 10.55 | | |
| r9 = −240.400 | d9 = 4.80 | n5 = 1.83400 | v5 = 37.2 |
| r10 = −42.751 | d10 = 4.35 | | |
| r11 = −24.062 | d11 = 2.00 | n6 = 1.84666 | v6 = 23.8 |
| r12 = 35.614 | d12 = 12.70 | n7 = 1.69680 | v7 = 55.5 |
| r13 = −35.618 | d13 = 9.85 | | |
| r14 = 51.084 | d14 = 16.30 | n8 = 1.60311 | v8 = 60.6 |
| r15 = −131.572 | d15 = 12.30 | | |
| *r16 = 65.728 | d16 = 13.80 | n9 = 1.49171 | v9 = 57.4 |
| r17 = −53.450 | d17 = 2.60 | | |
| r18 = −40.268 | d18 = 2.50 | n10 = 1.51633 | v10 = 64.1 |
| r19 = −81.745 | d19 = 1.00 | | |
| r20 = ∞ | d20 = 4.90 | n11 = 1.49000 | v11 = 58.6 |
| r21 = ∞ | | | |

Aspheric Coefficients:

For r1:

k = 6.38524D + 00    A4 = 2.62579D − 05    A6 = −4.85519D − 10
A8 = 3.26770D − 14    A10 = 1.27707D − 16

For r16:

k = 3.48125D + 00    A4 = −5.92511D − 06    A6 = 1.90855D − 10
A8 = −3.36612D − 12    A10 = −3.60400D − 16

Numerical Example 2:

f = 22.8    Fno = 1:1.5    2ω = 77°

| | | | |
|---|---|---|---|
| *r1 = 158.829 | d1 = 3.20 | n1 = 1.49171 | v1 = 57.4 |
| r2 = 29.808 | d2 = 19.26 | | |
| r3 = 35.284 | d3 = 2.00 | n2 = 1.51633 | v2 = 64.2 |
| r4 = 20.805 | d4 = 13.31 | | |
| r5 = −78.541 | d5 = 2.00 | n3 = 1.60311 | v3 = 60.7 |
| r6 = 311.087 | d6 = 7.10 | | |
| r7 = 47.391 | d7 = 5.65 | n4 = 1.84666 | v4 = 23.8 |
| r8 = −629.939 | d8 = 11.95 | | |
| r9 = −163.558 | d9 = 4.52 | n5 = 1.83400 | v5 = 37.2 |
| r10 = −44.398 | d10 = 8.55 | | |
| r11 = −26.656 | d11 = 2.50 | n6 = 1.84666 | v6 = 23.8 |
| r12 = 41.606 | d12 = 14.83 | n7 = 1.69680 | v7 = 55.5 |
| r13 = −39.384 | d13 = 10.00 | | |
| r14 = 51.558 | d14 = 16.78 | n8 = 1.60311 | v8 = 60.7 |
| r15 = −163.385 | d15 = 15.40 | | |
| *r16 = 64.745 | d16 = 11.62 | n9 = 1.49171 | v9 = 57.4 |
| r17 = −58.805 | d17 = 2.85 | | |
| r18 = −41.530 | d18 = 2.50 | | |
| r19 = −101.210 | | n10 = 1.51633 | v10 = 64.2 |

Aspheric Coefficients:

For r1:

k = 3.26228D + 00    A4 = 2.85154D − 06    A6 = −8.77607D − 10
A8 = 4.09913D − 13    A10 = −7.20761D − 17

For r16:

k = 1.64084D − 01    A4 = −4.66136D − 06    A6 = 8.37664D − 11
A8 = −3.68300D − 12    A10 = 2.39132D − 15

Numerical Example 3:

f = 21.07193    Fno = 1:1.5    2ω = 81.6°

-continued

| | | | |
|---|---|---|---|
| *r1 = 154.173 | d1 = 4.00 | n1 = 1.49171 | ν1 = 57.4 |
| r2 = 48.315 | d2 = 13.78 | | |
| r3 = 67.457 | d3 = 3.20 | n2 = 1.51633 | ν2 = 64.1 |
| r4 = 25.536 | d4 = 8.28 | | |
| r5 = 27.833 | d5 = 3.00 | n3 = 1.51633 | ν3 = 64.1 |
| r6 = 20.494 | d6 = 15.90 | | |
| r7 = −133.512 | d7 = 1.80 | n4 = 1.51633 | ν4 = 64.1 |
| r8 = 133.509 | d8 = 1.26 | | |
| r9 = 42.447 | d9 = 5.85 | n5 = 1.84666 | ν5 = 23.8 |
| r10 = −209.136 | d10 = 7.50 | | |
| r11 = −66.939 | d11 = 3.70 | n6 = 1.83400 | ν6 = 37.2 |
| r12 = −37.683 | d12 = 7.91 | | |
| r13 = −25.087 | d13 = 2.20 | n7 = 1.84666 | ν7 = 23.8 |
| r14 = 34.968 | d14 = 14.30 | n8 = 1.69680 | ν8 = 55.5 |
| r15 = −34.971 | d15 = 6.84 | | |
| r16 = 54.229 | d16 = 15.80 | n9 = 1.60311 | ν9 = 60.6 |
| r17 = −102.193 | d17 = 9.64 | | |
| *r18 = 67.149 | d18 = 13.50 | n10 = 1.49171 | ν10 = 57.4 |
| r19 = −54.806 | d19 = 3.53 | | |
| r20 = −38.859 | d20 = 3.20 | n11 = 1.51633 | ν11 = 64.1 |
| r21 = −82.721 | d21 = 0.20 | | |
| r22 = ∞ | d22 = 4.90 | n12 = 1.49000 | ν12 = 58.6 |
| r23 = ∞ | | | |

Aspheric Coefficients:

For r1:

k = 4.07228D + 00    A4 = 2.43265D − 06    A6 = −7.68320D − 10
A8 = 3.22413D − 13   A10 = −4.37802D − 17

For r18:

k = −8.89069D − 01   A4 = −4.17110D − 06   A6 = 5.93365D − 10
A8 = −2.90390D − 12  A10 = 2.55634D − 15

Numerical Example 4:

f = 22.0    Fno = 1:1.3    2ω = 76.6°

| | | | |
|---|---|---|---|
| *r1 = 106.540 | d1 = 3.20 | n1 = 1.49171 | ν1 = 57.4 |
| r2 = 25.268 | d2 = 24.24 | | |
| r3 = 31.382 | d3 = 2.00 | n2 = 1.51633 | ν2 = 64.2 |
| r4 = 22.388 | d4 = 10.11 | | |
| r5 = −86.009 | d5 = 2.00 | n3 = 1.60311 | ν3 = 60.7 |
| r6 = 336.619 | d6 = 5.25 | | |
| r7 = 48.817 | d7 = 6.43 | n4 = 1.84666 | ν4 = 23.8 |
| r8 = −999.799 | d8 = 10.08 | | |
| r9 = −103.700 | d9 = 5.51 | n5 = 1.83400 | ν5 = 37.2 |
| r10 = −41.590 | d10 = 9.99 | | |
| r11 = −26.867 | d11 = 2.50 | n6 = 1.84666 | ν6 = 23.8 |
| r12 = 47.400 | d12 = 17.92 | n7 = 1.69680 | ν7 = 55.5 |
| r13 = −45.053 | d13 = 0.21 | | |
| r14 = 60.600 | d14 = 15.62 | n8 = 1.60311 | ν8 = 60.7 |
| r15 = −270.988 | d15 = 1.54 | | |
| r16 = 137.314 | d16 = 8.95 | n9 = 1.60311 | ν9 = 60.7 |
| r17 = −211.880 | d17 = 13.67 | | |
| *r18 = 150.570 | d18 = 9.05 | n10 = 1.49171 | ν10 = 57.4 |
| r19 = −56.877 | d19 = 2.90 | | |
| r20 = −41.499 | d20 = 2.50 | n11 = 1.51633 | ν11 = 64.2 |
| r21 = −68.599 | | | |

Aspheric Coefficients:

For r1:

k = 4.80344D + 00    A4 = 2.93679D − 06    A6 = −8.25623D − 10
A8 = 3.22479D − 13   A10 = −3.01715D − 17

For r18:

k = −3.35166D + 01   A4 = −4.13775D − 06   A6 = −1.35342D − 09
A8 = 1.94824D − 13   A10 = −2.08866D − 16

Numerical Example 5:

f = 21.85975    Fno = 1:1.35    2ω = 79.4°

| | | | |
|---|---|---|---|
| *r1 = 85.441 | d1 = 3.20 | n1 = 1.49171 | ν1 = 57.4 |
| r2 = 29.261 | d2 = 21.27 | | |
| r3 = 67.896 | d3 = 2.00 | n2 = 1.60311 | ν2 = 60.7 |
| r4 = 24.641 | d4 = 21.56 | | |
| r5 = 55.696 | d5 = 4.67 | n3 = 1.84666 | ν3 = 23.8 |
| r6 = 225.731 | d6 = 15.35 | | |
| r7 = −270.587 | d7 = 5.27 | n4 = 1.83400 | ν4 = 37.2 |
| r8 = −45.202 | d8 = 11.75 | | |
| r9 = −28.818 | d9 = 2.50 | n5 = 1.84666 | ν5 = 23.8 |
| r10 = 53.053 | d10 = 15.62 | n6 = 1.69680 | ν6 = 55.5 |

-continued

| | | | |
|---|---|---|---|
| r11 = −40.035 | d11 = 0.25 | | |
| r12 = 47.476 | d12 = 15.72 | n7 = 1.60311 | ν7 = 50.7 |
| r13 = −189.244 | d13 = 17.93 | | |
| *r14 = 45.871 | d14 = 9.00 | n8 = 1.49171 | ν8 = 57.4 |
| r15 = −81.095 | d15 = 3.81 | | |
| r16 = −38.326 | d16 = 2.50 | n9 = 1.51633 | ν9 = 64.2 |
| r17 = −250.550 | | | |

Aspheric Coefficients:

For r1:

k = −1.05950D + 00   A4 = 2.73919D − 06    A6 = −5.58766D − 10
A8 = 4.81445D − 13

For r14:

k = −4.10766D − 01   A4 = −3.88384D − 06   A6 = 7.61938D − 10
A8 = −4.40278D − 12

Numerical Example 6:

f = 21.7    Fno = 1:1.7    2ω = 80°

| | | | |
|---|---|---|---|
| *r1 = 88.844 | d1 = 3.20 | n1 = 1.49171 | ν1 = 57.4 |
| r2 = 29.088 | d2 = 21.30 | | |
| r3 = 58.534 | d3 = 2.00 | n2 = 1.60311 | ν2 = 60.7 |
| r4 = 24.639 | d4 = 22.55 | | |
| r5 = 59.014 | d5 = 3.87 | n3 = 1.84666 | ν3 = 23.8 |
| r6 = 187.002 | d6 = 18.14 | | |
| r7 = −282.406 | d7 = 4.81 | n4 = 1.83400 | ν4 = 37.2 |
| r8 = −45.582 | d8 = 12.42 | | |
| r9 = −27.721 | d9 = 2.50 | n5 = 1.84666 | ν5 = 23.8 |
| r10 = 63.534 | d10 = 14.29 | n6 = 1.69680 | ν6 = 55.5 |
| r11 = −36.486 | d11 = 0.70 | | |
| r12 = 47.441 | d12 = 14.28 | n7 = 1.60311 | ν7 = 60.7 |
| r13 = −184.453 | d13 = 17.50 | | |
| *r14 = 47.738 | d14 = 9.53 | n8 = 1.49171 | ν8 = 57.4 |
| r15 = −82.383 | d15 = 3.96 | | |
| r16 = −38.379 | d16 = 2.50 | n9 = 1.51633 | ν9 = 64.2 |
| r17 = −55191.055 | | | |

Aspheric Coefficients:

For r1:

k = 1.49476D + 00    A4 = 2.33769 − 06    A6 = −7.44088D − 10
A8 = 5.77423D − 13

For r14:

k = −1.60470D + 00   A4 = −1.82688D − 06   A6 = 2.13164D − 10
A8 = −2.75644D − 12

Numerical Example 7:

f = 21.7    Fno = 1:1.35    2ω = 79.8°

| | | | |
|---|---|---|---|
| *r1 = 62.306 | d1 = 3.20 | n1 = 1.49171 | ν1 = 57.4 |
| r2 = 27.360 | d2 = 14.31 | | |
| r3 = 61.122 | d3 = 2.50 | n2 = 1.60311 | ν2 = 60.7 |
| r4 = 26.642 | d4 = 15.49 | | |
| r5 = 156.115 | d5 = 4.98 | n3 = 1.83400 | ν3 = 37.2 |
| r6 = −191.609 | d6 = 3.51 | | |
| r7 = 38.331 | d7 = 2.00 | n4 = 1.69680 | ν4 = 55.5 |
| r8 = 24.097 | d8 = 55.5 | | |
| r9 = 30.991 | d9 = 3.27 | n5 = 1.84666 | ν5 = 23.8 |
| r10 = 40.477 | d10 = 12.82 | | |
| r11 = −81.437 | d11 = 4.56 | n6 = 1.83400 | ν6 = 37.2 |
| r12 = −35.241 | d12 = 16.01 | | |
| r13 = −41.023 | d13 = 2.50 | n7 = 1.84666 | ν7 = 23.8 |
| r14 = 43.793 | d14 = 18.50 | n8 = 1.69680 | ν8 = 55.5 |
| r15 = −43.880 | d15 = 0.20 | | |
| r16 = 49.901 | d16 = 14.05 | n9 = 1.60311 | ν9 = 60.7 |
| r17 = 1849.845 | d17 = 0.20 | | |
| r18 = 112.604 | d18 = 7.01 | n10 = 1.60311 | ν10 = 60.7 |
| r19 = 10273.679 | d19 = 12.76 | | |
| *r20 = 48.228 | d20 = 10.99 | n11 = 1.49171 | ν11 = 57.4 |
| r21 = −129.938 | d21 = 4.61 | | |
| r22 = −44.538 | d22 = 3.00 | n12 = 1.51633 | ν12 = 64.2 |
| r23 = 6774.193 | | | |

Aspheric Coefficients:

For r1:

k = 1.83717D + 00    A4 = 1.75853D − 06    A6 = −6.97050D − 10
A8 = 4.47705D − 13

-continued

For r20:

k = 1.05027D − 01   A4 = −2.30976D − 06   A6 = 1.58987D − 09
A8 = −1.42683D − 12

Numerical Example 8:

| f = 22.1 | Fno = 1:1.35 | 2ω = 78.8° | |
|---|---|---|---|
| r1 = 66.844 | d1 = 12.00 | n1 = 1.51633 | v1 = 64.2 |
| r2 = 174.944 | d2 = 0.20 | | |
| r3 = 51.872 | d3 = 3.20 | n2 = 1.60311 | v2 = 60.7 |
| r4 = 24.730 | d4 = 12.26 | | |
| r5 = 92.254 | d5 = 2.50 | n3 = 1.69680 | v3 = 55.5 |
| r6 = 23.952 | d6 = 14.76 | | |
| r7 = 153.240 | d7 = 7.27 | n4 = 1.64769 | v4 = 33.8 |
| r8 = −69.262 | d8 = 2.69 | | |
| r9 = 37.022 | d9 = 2.00 | n5 = 1.69680 | v5 = 55.5 |
| r10 = 23.947 | d10 = 3.60 | | |
| r11 = 25.399 | d11 = 4.42 | n6 = 1.84666 | v6 = 23.8 |
| r12 = 27.623 | d12 = 4.94 | | |
| r13 = −62.729 | d13 = 4.20 | n7 = 1.83400 | v7 = 37.2 |
| r14 = −28.825 | d14 = 11.65 | | |
| r15 = −25.729 | d15 = 2.50 | n8 = 1.84666 | v8 = 23.8 |
| r16 = 56.708 | d16 = 14.69 | n9 = 1.69680 | v9 = 55.5 |
| r17 = −33.863 | d17 = 0.20 | | |
| r18 = 93.716 | d18 = 12.08 | n10 = 1.69680 | v10 = 55.5 |
| r19 = −86.420 | d19 = 0.19 | | |
| r20 = −764.222 | d20 = 4.58 | n11 = 1.69680 | v11 = 55.5 |
| r21 = −134.065 | d21 = 14.11 | | |
| r22 = 177.672 | d22 = 5.86 | n12 = 1.60311 | v12 = 60.7 |
| r23 = −220.043 | d23 = 4.70 | | |
| r24 = 47.441 | d24 = 5.49 | n13 = 1.51633 | v13 = 64.2 |
| r25 = 122.990 | d25 = 7.10 | | |
| r26 = −43.645 | d26 = 3.00 | n14 = 1.51633 | v14 = 64.2 |
| r27 = −140.619 | | | |

It will be appreciated that according to the invention, with the use of a small number of constituent lenses, the speed is as high as 1.5 or thereabout in F-number, and the telecentricity is so excellent that the marginal zone becomes 50–60% of the illumination of the paraxial one. It is, therefore, made possible to realize a large relative aperture wide-angle telecentric lens of good optical performance most suited to the projection lens for the single chip type liquid crystal projector.

The present invention has another advantage arising from as wide an angle of projection as 80° or thereabout. Such a projection lens is, therefore, optimal, particularly, as the projection lens for the rear projection type television set.

I claim:

1. A telecentric lens system, comprising, in order from a large conjugate side to a small conjugate side, a first lens unit of positive refractive power and a second lens unit having at least one positive lens element and a negative lens element having a refractive power on the large conjugate side which is stronger than that of an opposite surface thereof, wherein said first lens unit comprises, in order from the large conjugate side to the small conjugate side, at least two negative meniscus lens elements convex toward the large conjugate side, a positive lens element having a refractive power on the large conjugate side which is stronger than that of an opposite surface thereof, a positive lens element having a refractive power on the small conjugate side which is stronger than that of an opposite surface thereof, a cemented lens composed of, in order from the large conjugate side to the small conjugate side, a negative lens element and a positive lens element and having a cemented surface convex toward the large conjugate side, and at least one positive lens.

2. A telecentric lens system according to claim 1, satisfying the following condition:

$-0.1 < f/f_2 < 0.35$ where f is a focal length of said telecentric lens system, and $f_2$ is a focal length of said second lens unit.

3. A telecentric lens system according to claim 1, satisfying the following conditions:

$0.1 < f/f_{2p} < 0.5$ $-0.5 < f/f_{2n} < -0.02$ where $f_{2p}$ is a focal length of a positive lens element in said second lens unit, $f_{2n}$ is a focal length of a negative lens element in said second lens unit, and f is a focal length of said telecentric lens system.

4. A telecentric lens system according to claim 1, satisfying the following condition:

$0.05 < d_{m2}/f < 0.35$ where $d_{m2}$ is an air separation between said negative lens element and a positive lens element adjacent to said negative lens element in said second lens unit, and f is a focal length of said telecentric lens system.

5. A telecentric lens system according to claim 1, satisfying the following conditions:

$-20 < v_{2p} - v_{2n} < 20$ $20 < v_{1hp} - v_{1hn} < 45$ $20 < v_{1fn} - v_{1mfp} < 50$ where $v_{2p}$ is a mean value of Abbe numbers of said at least one positive lens element in said second lens unit, $v_{2n}$ is an Abbe number of said negative lens element in said second lens unit, $v_{1hp}$ is an Abbe number of said positive lens element in said cemented lens in said first lens unit, $v_{1hn}$ is an Abbe number of said negative lens element in said cemented lens in said first lens unit, $v_{1fn}$ is a mean value of Abbe numbers of negative lens elements which are disposed on the large conjugate side of said positive lens element having a refractive power on the large conjugate side which is stronger than that of an opposite surface thereof, in said first lens unit, and $v_{1mfp}$ is an Abbe number of said positive lens element having a refractive power on the large conjugate side which is stronger than that of an opposite surface thereof, in said first lens unit.

6. A telecentric lens system according to claim 1, satisfying the following conditions:

$n_{1mfp} > 1.7$ $n_{1mrp} > 1.7$ where $n_{1mfp}$ is a refractive index of said positive lens element having a refractive power on the large conjugate side which is stronger than that of an opposite surface thereof, in said first lens unit, and $n_{1mrp}$ is a refractive index of said positive lens element having a refractive power on the small conjugate side which is stronger than that of an opposite surface thereof, in said first lens unit.

7. A telecentric lens system according to claim 1, satisfying the following conditions:

$0.1 < D_{12}/f < 1.3$ $0.08 < f/l_1 < 0.35$ where $D_{12}$ is an air separation between said first lens unit and said second lens unit, $l_1$ is an overall length of said first lens unit, and f is a focal length of said telecentric lens system.

8. A telecentric lens system according to claim 1, wherein said first lens unit and said second lens unit each have at least one aspheric surface.

9. A telecentric lens system according to claim 8, wherein the aspheric surface in said first lens unit takes a position nearest to the large conjugate side in said first lens unit, and, in a case where the aspheric surface is used in a negative lens element, a negative power of the aspheric surface becomes progressively weaker away from an optical axis, and in a case where the aspheric surface is used in a positive lens element, a positive power of the aspheric surface becomes progressively stronger away from the optical axis.

10. A telecentric lens system according to claim 8, wherein the aspheric surface in said second lens unit is arranged such that, in a case where the aspheric surface is used in a positive lens element, a positive power of the aspheric surface becomes progressively weaker away from an optical axis, and in a case where the aspheric surface is used in a negative lens element, a negative power of the aspheric surface becomes progressively stronger away from the optical axis.

11. A telecentric lens system according to claim 1, wherein said at least one positive lens element in said second lens unit consists of one bi-convex lens.

12. A telecentric lens system according to claim 1, wherein a point at which an on-axial principal ray and an off-axial principal ray intersect lies in between two positive lens elements which are disposed approximately in a middle portion in said first lens unit.

\* \* \* \* \*

UNITED STATES PATENT AND TRADEMARK OFFICE
CERTIFICATE OF CORRECTION

PATENT NO. : 5,920,433
DATED : July 6, 1999
INVENTOR(S) : SABURO SUGAWARA

It is certified that error appears in the above-identified patent and that said Letters Patent is hereby corrected as shown below:

COLUMN 3
  Line 12, "an the" should read --is the--.

Signed and Sealed this

Twenty-eighth Day of November, 2000

Attest:

Attesting Officer

Q. TODD DICKINSON

Director of Patents and Trademarks